United States Patent Office 3,053,905
Patented Sept. 11, 1962

3,053,905
PREPARATION OF ALCOHOLS
Donald M. Coyne, Paul A. Lobo, and Billy J. Williams, Ponca City, Okla., assignors to Continental Oil Company, Ponca City, Okla., a corporation of Delaware
No Drawing. Filed Dec. 8, 1958, Ser. No. 778,615
9 Claims. (Cl. 260—632)

The present invention relates to a novel process for the preparation of alcohols and more particularly relates to a novel process for preparing primary alcohols from organo aluminum compounds and an alpha-olefin and still more particularly for preparing primary alcohols of a more uniform average molecular weight from alkyl aluminum compounds resulting from the growth process.

It is well known that the product of the growth reaction is a complex mixture of trialkylaluminum compounds. The particular distribution of the products is dependent upon the conditions employed during the growth reaction; however, as a general rule for a particular set of conditions, there is a predominance of compounds produced which correspond to some relatively narrow range of molecular weight or better to some relatively narrow range in numbers which represents the number of carbon atoms in the hydrocarbon portion of the trialkylaluminum. Such a complex mixture is somewhat difficult to separate. This mixture contains such a broad distribution in length of the alkyl radicals within the same and different molecules that any subsequent reaction produces a complex mixture which is unsatisfactory for many intended purposes. A more narrow distribution in number of carbon atoms contained therein would enable the compound and derivatives to satisfy a specific intended purpose.

It is known in the art that compounds such as trialkylaluminums can be reacted with olefins having different molecular weights than the hydrocarbon radicals chemically bonded to the aluminum atom in the presence of metal catalysts to displace the hydrocarbon radicals chemically bonded to the aluminum atom with hydrocarbon radicals corresponding to the olefins.

It is also known in the art that compounds such as trialkylaluminums may be partially oxidized with molecular oxygen to produce aluminum alkoxides and, subsequently, to produce alcohols upon hydrolysis. The alkoxides and subsequently alcohols corresponding to the hydrocarbon radicals on the starting trialkylaluminum compound are produced thereby.

The prior art methods are feasible and, when employed separately, are satisfactory for some purposes; however, in other cases, they possess serious disadvantages. Among these are the necessity for the separate step of displacement and in such cases the need to remove the displacement catalyst after such has been completed.

A principal object of the present invention is to prepare a mixture of alcohols having more uniform average molecular weight directly from growth product alkyl aluminums and olefins.

Another object of the present invention is to prepare higher molecular weight alcohols directly from lower molecular weight hydrocarbon-substituted-aluminum compounds.

Another object of the present invention is to do so without the presence of displacement catalysts.

Still another object of the present invention is to accomplish the principal object in a fewer number of process steps.

Another object is to do the above in a more economical manner than prior art processes.

These and other objects are accomplished with relative ease by the process of the present invention, which will be more fully understood from the ensuing discussion and illustrative examples.

Briefly, the present invention comprises reacting a mixture of trialkylaluminum and an alpha-olefin with molecular oxygen to produce upon hydrolysis an alcohol mixture containing as a major portion an alcohol corresponding to the alpha-olefin.

The trihydrocarbon-substituted-aluminum suitable in this process may be defined as one having the structure:

wherein R, $R_1$, and $R_2$ may be the same and represent hydrocarbon radicals. The hydrocarbon radicals represented may be alkyl, alicyclic, or alkyl-substituted alicyclic. As examples of the alicyclic radicals suitable herein is cyclohexyl and of the alicyclic substituted is phenylethyl and cyclohexylethyl radicals. The alpha-olefin to be mixed with the aluminum compound and its partial oxidation effected is one having the general formula $$R_3R_4C\!=\!CH_2$$

where either $R_3$ or $R_4$ may be H, and both may be alkyl radicals totaling 4 to 20 carbon atoms, either $R_3$ or $R_4$ may be saturated or unsaturated alicyclics, and one may be a substituted alkyl radical wherein the substituent is an alicyclic radical. The alpha-olefin is to be of different carbon content than at least one of R, $R_1$, and $R_2$ which it is reacted with. The α-olefin may also be either aliphatic or an alkylene-substituted alicyclic alpha-olefin, such as 1-hexene, 1-hexadecene and 4-phenyl-1-butene, 3-cyclohexyl-1-propene, 2-ethyl-1-butene, 4(4-ethylphenyl)-1-butene, and the like.

For simplicity and convenience, the organo-aluminum compounds are being referred to as alkyl or trialkyl, although it is to be understood that the aluminum compounds contemplated encompasses much more and is intended to convey that the aluminum compound is as defined above except when otherwise indicated. Also for simplicity and convenience, partial oxidation will be hereinafter called oxidation.

The displacement reaction has been found necessary in connection with the growth process to obtain alkyl aluminums having a more uniform average molecular weight which, in this case, upon oxidation and hydrolysis will yield an alcohol mixture having a desired more uniform average molecular weight. Without the displacement reaction, it is commercially impossible in practice to obtain anything but a random mixture of alkyl aluminums particularly in any substantial quantity.

This process makes possible the manufacture of higher alcohols from higher alpha-olefins without the necessity of using displacement catalysts, such as nickel and cobalt. This has many advantages not readily apparent. When one uses a displacement catalyst, such must be eventually removed from any streams intended for recycle. The preferred mode of employing such metal displacement catalyst is in colloidal form, and its removal from recycle streams is particularly troublesome when present as a colloid. Very often complete removal of the displacement catalysts may require its destruction which makes the use of catalysts under such circumstances even more expensive than when catalyst can be recovered to permit olefin recycle. Olefins removed in the present process may be recycled without fear of catalyst contamination causing any deleterious effects.

The fact that a mixture of trialkylaluminum and an olefin can be partially oxidized directly to produce alcohol upon hydrolysis from the olefin without first performing the separate step of displacement is rather surprising; and it is altogether unexpected that such can be done without a catalyst and/or requiring unusually long contact times and, additionally, that such can take place at milder conditions than that normally required to perform at least one of such steps separately, specifically at a lower temperature than that normally required even when a catalyst is employed in the displacement reaction.

By this process it is possible, if desired, to begin with ethylene and form growth products comprising trialkylaluminum compounds, wherein the alkyl radicals of such a compound possess a chain several times that of ethylene from which it is made. This may be done by any of those methods known to the art. An increase in the average molecular weight of the alcohols subsequently produced may be achieved by oxidizing a mixture of the alkylaluminum and an olefin of higher molecular weight, higher molecular weight hydrocarbon radicals of length corresponding to the length of the olefin being extremely difficult to produce by the growth process. As it is well known in the art, it becomes increasingly difficult to extend the length of the chain of the hydrocarbon radical attached to the aluminum, as the chain becomes long; but by this process, the trialkylaluminum compounds having short chained hydrocarbon radicals which are easier to make, can be made and charged with an olefin of the desired length. This mixture is subsequently oxidized and hydrolyzed without having to first grow the hydrocarbon radical chain to the desired length, or first reacting an olefin of the desired chain length with an alkyl aluminum in the displacement reaction wherein the disadvantages in either using or not using a displacement catalyst, heretofore found necessary in such a single and separate step, are avoided.

Even when the alkyl aluminum is not prepared from ethylene by means of the growth process and is for all practical purposes a pure single trialkylaluminum, the present invention makes possible the production of various alcohols without the displacement reaction. Furthermore, when alkyl aluminum is obtained from the growth process, a more uniform average molecular weight alcohol may be produced without first separating any one alkyl aluminums which, if attempted, would yield negligible amounts of a single alkyl aluminum. One main stock of alkyl aluminum may thus be kept for the production of various alcohols, and it should be remembered without the necessity of the cumbersome interim displacement reaction. In addition to avoiding the bothersome problem of catalyst removal required by the displacement reaction per se, even if the catalyst were satisfactorily recovered, the economics of not having to perform an intermediate step can be greatly appreciated by those skilled in the art.

Another facet of the process, possibly as unexpected as some of its other features, is the fact that all the products recovered have some utility so that there is not substantial loss of any compounds charged or produced. To further explain this in the preparation of dodecyl alcohol from trialkylaluminum, the products of such a reaction are dodecyl alcohol, paraffin hydrocarbons, unsaturated hydrocarbons, alcohols other than dodecyl, aluminum hydroxide and alkyl aluminum. All of the above products when purified may be either used or sold. The unsaturated hydrocarbons may be used to form trialkylaluminums or charged with trialkylaluminum from the growth process and oxidized with oxygen to produce alcohols. The paraffins may be, if desired, cracked and used to prepare alkyl aluminum or alcohols corresponding to the particular olefin or olefins produced by the cracking.

Increasing the amount of a particular alcohol, such as occurs by the present process, amounts to a shifting of the product distribution curve. While it will generally be found preferred in practice to shift the products to the higher molecular weight compounds, the invention is not restricted thereto; and the average molecular weight of the mixture may be shifted in either direction.

When an olefin is used in the present process, it serves as a diluent. A diluent as taught by prior art is preferred in the oxidation of alkyl aluminums. In this process there is no inert diluent per se required, and there is no inert diluent to be separated in addition to the purification or separation of other compounds. The olefin itself acts at the same time as a diluent to control the oxidation of the alkyl aluminum and as an actively participating compound. Such controlling of oxidation of the alkyl aluminum at least initially could be aiding in the increase percentagewise of alcohol corresponding to the olefin by retarding the oxidation of less desired alkyl radicals attached to the aluminum atom.

The mechanism involved is possibly an in-situ displacement of the lower molecular weight hydrocarbon radicals on the aluminum with immediate oxidation thereof; however this is only speculation, and it may be that the trialkylaluminum acts as a catalyst or intermediate oxygen carrier to make possible the conversion of the straight chain 1-olefins to alcohols directly. The shifting of the average molecular weight of the alcohol mixture may be accomplished through the cumulative results of (1) oxidation of any hydrocarbon radicals of the desired length which are chemically bound to the aluminum atom and (2) oxidation of the olefin. The shorter chained alcohols are produced but in lesser amounts, probably as a result of in-situ displacement.

Depending on the shift in average molecular weight of compounds desired, the trialkyaluminum may be mixed in varying proportions or ratios with the alpha-olefins. As would be expected, the greater amount of olefin employed up to 3 times as much olefin as trialkylaluminum, the more uniform is the average molecular weight of the product and the greater the shift in the average molecular weight, depending somewhat on the difference between the alkyls of the aluminum and the olefin. Similar advantages may be gained by increasing the ratio of olefin to trialkylaluminum above 3 to 1.

This effect of ratio is true, as might be expected, regardless of the mechanism involved in the present process. For if in-situ displacement takes place, then the greater number of olefin molecules available, the more of the less desired alkyl radicals will be replaced by the olefin. If the mechanism involves the alkyl aluminum, probably as aluminum alkoxide, acting as a catalyst for the direct oxidation of the olefin, then the same would be true. The more olefin molecules available, the more that would be oxidized in preference to the oxidation of less desired compounds present.

If the results are cumulative through the occurence of both of the above possible mechanisms, then the same results are obtained from an increase in amount of olefins and for the same reasons.

The conditions to which the reaction is subjected will cause some variance in results. To elaborate, pressure is generally required when a lower olefin is charged to shift the average molecular weight of the products to a lower value. This will vary, depending on the particular olefin and trialkylaluminum compound employed. These pressures may range as high as 1,000 p.s.i.g. and even higher in some cases but for the most part pressures will usually be below 100 p.s.i.g.

The operable temperatures are to be found in a moderately broad range, usually from about 0 to 120° C. Temperatures generally should not be allowed to exceed about 120° C., since the oxidation may become uncontrollable and/or at least some deleterious decomposition takes place. At temperatures below 0° C., the reaction will not proceed, at least not to an appreciable degree. Even at temperatures, some above 0° C., the reaction is comparatively slow. The preferred range of temperature is from 50° to 100° C. Such temperatures will be found convenient for various reasons.

For purposes of duplication, the following more detailed description of the invention will be found helpful.

Trioctylaluminum was dissolved in 50 percent as much by weight of 1-dodecene, and the mixture was pumped continuously at the rate of 1.6 ml./min. into the top of a 1½-inch diameter by 30-inch long glass tube reactor packed with ¼-inch protruded stainless steel packing. Air, previously dried, was passed through the reactor at the rate of 1,000 cc./min. The temperature was controlled in general to 25–30° C. (a few hot spots were noted) by means of a water jacket surrounding the reactor proper. The reactor was maintained liquid full during the reaction, and product was continually collected. The reactor effluent was then hydrolyzed in 25 percent HCl. The organic layer was dried over anhydrous calcium sulfate and distilled. The product was found to contain, with respect to aluminum charged as trioctylaluminum, 26 percent 1-dodecanol, 43 percent 1-octanol, 24 percent n-octane, and 39 percent 1-octene, the remainder was aluminum alkyls, aluminum hydroxide, and $C_{16}$ dimer.

As previously indicated, if desired, more 1-dodecanol could have been prepared in the above reaction by employing a higher ratio of olefin to the alkyl aluminum. In the above case, only 50 percent as much olefin as alkyl aluminum was charged. If this were increased to 3 moles of olefin per mole of alkyl aluminum, the amount of 1-dodecanol would be greatly increased. In such a case, if desired, separation of a significant quantity of relative pure 1-dodecanol could be separated; however, in any case, the average molecular weight of the mixture would be greatly increased and would be at least more uniform than otherwise. Similar results were obtained using tri(4-phenylbutyl)aluminum, tricyclohexylaluminum, tri(propylcyclohexyl) aluminum, tripentylaluminum, and growth products, and with the α-olefins, namely, 1-hexene, 1-hexadecene, 4-phenyl-1-butene, 2-ethyl-1-butene, α-methyl styrene, 2-methyl butene, vinyl toluene, 2-ethyl-1-hexene, 2-phenyl-1-butene, and vinyl cyclohexene. Triphenylaluminum was not found successful in our experience, although theoretically it should have and it is possible that compounds having the phenyl radical attached to the Al are operable; but this is speculation, and these compounds are excluded in this invention.

While particular embodiments of the invention have been described, it will be understood, of course, that the invention is not limited thereto, since many modifications may be made; and it is therefore contemplated to cover by the appended claims any such modifications as fall within the true spirit and scope of the invention.

The invention having thus been described, what is claimed and desired to be secured by Letters Patent is:

1. A process of preparing primary alcohols which comprises reacting a mixture consisting esentially of an aluminum compound and an alpha-olefin, said aluminum compound having the structure:

wherein the R's may be the same and represent hydrocarbon radicals selected from the group consisting of alkyl, alicyclic, and alkyl substituted alicyclic radicals with the further restriction that at least one of these radicals is different in carbon content from the carbon content of the alpha-olefin, with oxygen at 0°–120° C., in the absence of a catalyst, and then hydrolyzing the resulting reaction mixture.

2. A process of preparing primary alcohols from alpha-olefins which comprises reacting a mixture of a trialkylaluminum and an alpha-olefin with molecular oxygen at 0–120° C. and in the absence of a catalyst, and wherein at least one of the alkyl groups of said trialkylaluminum is of different carbon content than said alpha-olefin and then hydrolyzing the reaction mixture.

3. A process of preparing primary alcohols from an alpha-olefin which comprises reacting a mixture consisting essentially of a trialkylaluminum and an alpha-olefin of 6 to 22 carbons, said trialkylaluminum having the structure:

wherein the R's may be the same and represent alkyl radicals with the further restriction that at least one of these radicals is different in carbon content from the carbon content of the olefin, with molecular oxygen at 0°–120° C., in the absence of a catalyst, and then hydrolyzing the reaction mixture.

4. A process of preparing primary alcohols from alpha-olefins which comprises reacting a mixture of trialkylaluminum and an alpha-olefin with air at 0°–120° C., in the absence of a catalyst and wherein at least one of the alkyl groups of said trialkyl aluminum is of different carbon content than said alpha-olefin and then hydrolyzing the reaction mixture.

5. A process according to claim 2 wherein the reaction temperature is 50°–100° C.

6. A process of preparing 1-dodecanol which comprises reacting a mixture of trioctylaluminum and 1-dodecene with molecular oxygen at 0°–120° C. in the absence of a catalyst, and then hydrolyzing the reaction mixture and separating the 1-dodecanol.

7. A process according to claim 6 wherein the temperature is 50°–100° C.

8. A process of preparing 1-dodecanol which comprises reacting a mixture of trioctylaluminum and 1-dodecene with air at 0° to 120° C. in the absence of a catalyst, and then hydrolyzing the reaction mixture and separating the 1-dodecanol.

9. A process according to claim 8 wherein the temperature is in the range of 50 to 100° C.

References Cited in the file of this patent

UNITED STATES PATENTS

| | | |
|---|---|---|
| 2,835,589 | Ziegler et al. | May 20, 1958 |
| 2,863,895 | Kirshenbaum et al. | Dec. 9, 1958 |